US010026077B2

(12) United States Patent
Hosny et al.

(10) Patent No.: US 10,026,077 B2
(45) Date of Patent: Jul. 17, 2018

(54) PAYMENT CARDS FOR MULTIPLE ACCOUNTS, AND METHODS ASSOCIATED THEREWITH

(71) Applicant: MASTERCARD INTERNATIONAL INCORPORATED, Purchase, NY (US)

(72) Inventors: Ahmed Hosny, Dublin (IE); John Long, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 15/007,760

(22) Filed: Jan. 27, 2016

(65) Prior Publication Data
US 2016/0217455 A1   Jul. 28, 2016

(30) Foreign Application Priority Data

Jan. 28, 2015  (GB) .................................. 1501412.9

(51) Int. Cl.
*G06K 19/06* (2006.01)
*G06Q 20/34* (2012.01)
(Continued)

(52) U.S. Cl.
CPC .......... *G06Q 20/3572* (2013.01); *G06F 8/65* (2013.01); *G06K 19/06187* (2013.01); *G06K 19/06206* (2013.01); *G06K 19/07* (2013.01); *G06K 19/072* (2013.01); *G06K 19/0702* (2013.01); *G06K 19/0718* (2013.01); *G06K 19/0723* (2013.01); *G06K 19/07707* (2013.01); *G06Q 20/341* (2013.01); *G06Q 20/4012* (2013.01)

(58) Field of Classification Search
CPC .... G06Q 20/34; G06Q 20/341; G06Q 20/357; G06Q 20/3572; G06Q 20/3574; G06Q 20/3576; G06Q 20/4012; G06K 19/07; G06K 19/072; G06K 19/0721; G06K 19/077; G06K 19/07745; G06K 19/07747; G07F 7/0806; G07F 7/0813; G07F 7/082; G07F 7/0826
USPC ........................................................ 235/492
See application file for complete search history.

(56) References Cited

U.S. PATENT DOCUMENTS

| 4,443,027 A * | 4/1984 | McNeely | ............... B42D 25/30 |
| | | | 235/487 |
| 5,049,728 A * | 9/1991 | Rovin | ................... G06K 19/072 |
| | | | 235/487 |

(Continued)

FOREIGN PATENT DOCUMENTS

| DE | 19956137 | 5/2001 | |
| EP | 1365353 A2 * | 11/2003 | ........... G09K 19/072 |

(Continued)

*Primary Examiner* — Thien M Le
*Assistant Examiner* — April Taylor
(74) *Attorney, Agent, or Firm* — Harness, Dickey & Pierce, P.L.C.

(57) ABSTRACT

Provided is a payment card for multiple accounts. The card comprises a card member; a plurality of programmable chips, at least one of which is releasably attached to the card member; each programmable chip has an associated personal identification number (PIN); and a control chip operable for selecting one of the programmable chips to be active during a transaction.

15 Claims, 3 Drawing Sheets

(51) Int. Cl.
*G06K 19/07* (2006.01)
*G06F 8/65* (2018.01)
*G06Q 20/40* (2012.01)
*G06K 19/077* (2006.01)

(56) References Cited

U.S. PATENT DOCUMENTS

| | | | | |
|---|---|---|---|---|
| 5,975,584 A | * | 11/1999 | Vogt | G06K 13/077 283/100 |
| 6,554,193 B1 | * | 4/2003 | Fehrman | G06K 19/077 235/487 |
| 6,623,039 B2 | * | 9/2003 | Thompson | B42D 15/045 281/51 |
| 7,472,829 B2 | * | 1/2009 | Brown | G06K 19/06206 235/380 |
| 7,703,690 B2 | * | 4/2010 | Ishikawa | G06K 19/07 235/380 |
| 8,161,546 B2 | * | 4/2012 | Parkinson | G06Q 20/3572 713/173 |
| 8,602,301 B1 | * | 12/2013 | Blossom | G06K 19/06187 235/380 |
| 8,977,569 B2 | * | 3/2015 | Rao | G06Q 20/341 705/41 |
| 9,183,487 B2 | * | 11/2015 | Aiyer | G06K 19/07745 |
| 2005/0171898 A1 | * | 8/2005 | Bishop | G06Q 20/00 705/39 |
| 2011/0084149 A1 | * | 4/2011 | Faith | G06Q 20/341 235/492 |
| 2013/0124413 A1 | * | 5/2013 | Itwaru | G06Q 20/4012 705/44 |
| 2014/0284383 A1 | * | 9/2014 | Rodriguez | G06K 19/072 235/441 |

FOREIGN PATENT DOCUMENTS

| | | |
|---|---|---|
| KR | 10-2010-0035378 | 12/2010 |
| WO | WO 2009064139 A1 * 5/2009 | ............. G06K 19/07 |

* cited by examiner

PAYMENT CARDS FOR MULTIPLE ACCOUNTS, AND METHODS ASSOCIATED THEREWITH

CROSS-REFERENCE TO RELATED APPLICATION

This application claims the benefit of, and priority to, Great Britain Application No. 1501412.9 filed Jan. 28, 2015. The entire disclosure of the above application is incorporated herein by reference.

FIELD

The present disclosure generally relates to payment cards for multiple accounts, and methods associated therewith. More particularly, but not exclusively, it relates to payment cards comprising a plurality of chips each associated with a corresponding account.

BACKGROUND

This section provides background information related to the present disclosure which is not necessarily prior art.

Payment cards such as credit cards and debit cards are very widely used for most forms of financial transaction. The use of payment cards has evolved significantly with technological developments over recent years. Originally, transactions were on paper, using an imprint of a transaction card and confirmed by a signature. This approach was largely replaced by use of a magnetic stripe of a transaction card swiped through a magnetic stripe reader on a point of sale (POS) terminal to perform a transaction. Transaction cards developed to contain an integrated circuit ("chip cards" or "smart cards") communicate with a smart card reader in the POS terminal. Using this approach, a transaction is typically confirmed by a personal identification number (PIN) entered by the card user. Cards of this type typically operate under the EMV standard for interoperation of chip cards and associated apparatus (such as POS terminals and ATMs).

Typically, most people have multiple accounts and therefore require multiple payment cards. It may be inconvenient for a person to carry a large number of payment cards as wallets have limited capacity.

SUMMARY

This section provides a general summary of the disclosure, and is not a comprehensive disclosure of its full scope or all of its features. Aspects and embodiments of the disclosure are also set out in the accompanying claims.

In accordance with an aspect of the present disclosure, there is provided a payment card for multiple accounts; the payment card generally comprises: a card member; a plurality of programmable chips, at least one of which is releasably attached to the card member; each programmable chip has an associated personal identification number (PIN); and a control chip operable for selecting one of the programmable chips to be active during a transaction.

In one embodiment, a programmable magnetic stripe is provided on the payment card. Advantageously, the control chip is configured to communicate with the magnetic stripe. Preferably, the control chip is configured to control the magnetic stripe. In one example, the control chip is operable for selectively activating the magnetic strip. In another example, the control chip is operable for selectively deactivating the magnetic stripe.

In another embodiment, the control chip is configured to provide virtual card capabilities.

In a further embodiment, a near field communication module is provided.

In one embodiment, a biometric reader is provided. Advantageously, the biometric reader is operable to read a fingerprint.

In another embodiment, an indicator is provided for indicating the selected one of the programmable chips. Advantageously, the indicator comprises a light source associated with a corresponding one of the programmable chips.

In one embodiment, a display is provided. In an exemplary embodiment, a power source is provided. In one example, the power source comprises a battery. In another example, the power source comprises a solar cell.

In another embodiment, the payment card is configured to derive power from a point of sale (POS) terminal (broadly, POS device) when inserted therein during a transaction. Advantageously, the POS terminal provides a menu for facilitating a user selecting one of the programmable chips to be active during the transaction.

The present disclosure is also directed to a method of manufacturing a payment card for multiple accounts, the method generally comprising: providing a card member; providing a plurality of programmable chips, at least one of which is releasably attached to the card member; each programmable chip has an associated personal identification number (PIN); and providing a control chip which is operable for selecting one of the programmable chips to be active during a transaction.

In one embodiment, the method includes configuring a mobile device (e.g., a mobile phone, etc.) to communicate with the payment card using near field communication (NFC).

In another embodiment, the mobile device is configured to communicate with the control chip.

In one exemplary arrangement, the mobile device is configured to provide software updates to the programmable chips.

These and other aspects are addressed by providing a payment card which includes a plurality of chips each associated with a corresponding account.

Further areas of applicability will become apparent from the description provided herein. The description and specific examples and embodiments in this summary are intended for purposes of illustration only and are not intended to limit the scope of the present disclosure. In addition, the above and other features will be better understood with reference to the followings Figures which are provided to assist in an understanding of the present teaching.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
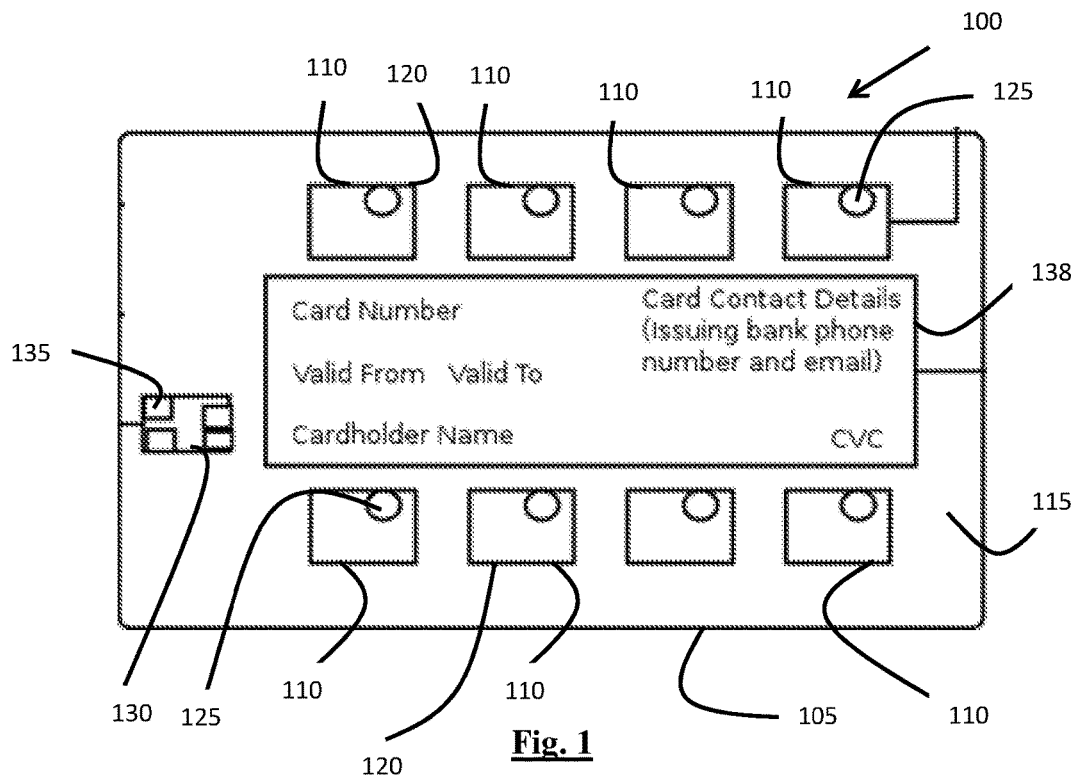
FIG. 1 is a front view of a payment card according to an exemplary embodiment of the present teaching.

Exemplary embodiments will now be described more fully with reference to the accompanying drawings. In particular, embodiments of the present disclosure will now be described with reference to some exemplary payment cards. It will be understood that the exemplary payment cards are provided to assist in an understanding of the present teaching and are not to be construed as limiting in any fashion. Furthermore, modules or elements that are described with reference to any one Figure may be interchanged with those of other Figures or other equivalent elements without departing from the spirit of the present teaching.

It will be appreciated that in the following, the term account is intended to include bank accounts, credit accounts, deposit accounts, checking accounts and the like. In a typical transaction using a credit or debit card, a cardholder wishing to complete a transaction (or make a payment) provides a card number together with other card details (such as a card expiry date, card code verification (CCV) number etc.) to a merchant at a point of sale. The merchant transmits the card number and the details to an 'acquirer', i.e., a financial institution that facilitates and processes card payments made to the merchant. The acquirer then transmits an authorization request via a payment card network to an issuer or provider of the card used to make the payment.

A payment card or data associated with a payment account may be provided to a merchant in order to fund a financial transaction via the associated payment account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated payment account.

A payment network is a system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, American Express®, etc. The issuer processes the received request and determines whether or not the request is allowable. If the issuer determines that the payment request is allowable, an authorization response is transmitted via the payment card network to the acquirer and transfer of the payment amount to the merchant's account is initiated. Responsive to receiving the authorization response from the issuer, the acquirer communicates the authorization response to the merchant. In this manner, a card number may be used to effect a card payment to a merchant.

Figure 2:
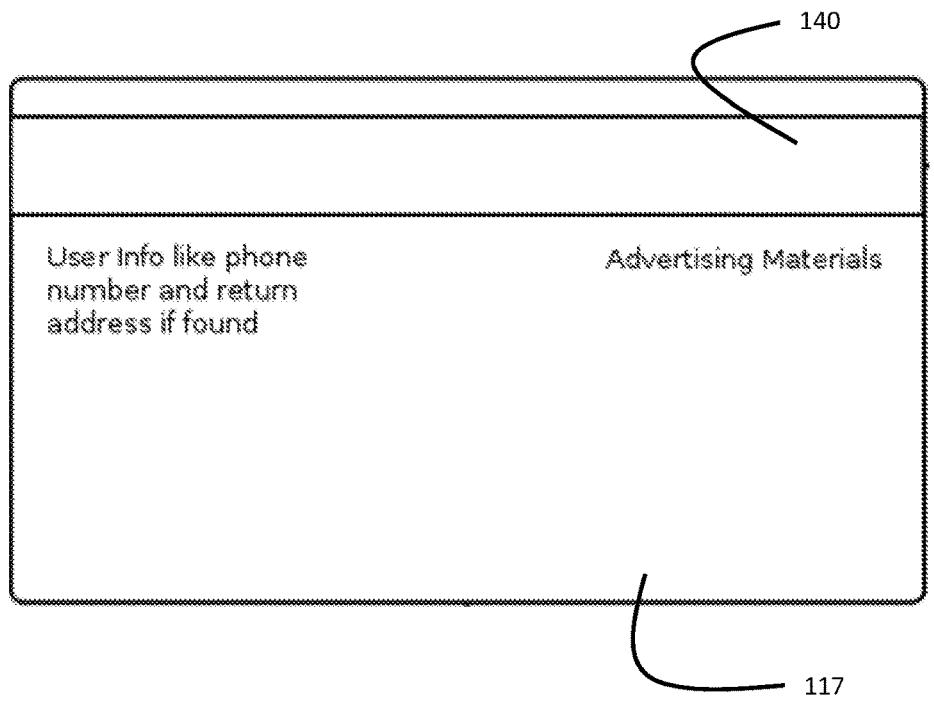
FIG. 2 is a rear view of the payment card of FIG. 1.

Referring initially to FIGS. 1 and 2, there is provided a payment card 100 for multiple accounts in accordance with the present disclosure. The payment card 100 comprises multiple programmable chips 110 at least one of which is releasably attached to a card member 105. It will be appreciated that more than one, possibly all, of the chips 110 may be releasably attached to the card member 105. Each of the chips 110 is associated with a corresponding account of the card holder. A control chip 130 is in communication with each of the chips 110 and includes switching logic for facilitating a user to actively select one of the chips 110 to be active during a transaction. Thus, a user is able to select one of the chips 110 to complete a transaction. The accounts which are associated with the chips 110 can be from the same issuer or from different issuers. Typically, when a bank wants to give a customer the ability to do a payment, it issues a payment card. Most customers will have more than one card either from the same bank or from multiple banks. In order to cut the costs and produce a better user experience the payment card 100 includes multiple programmable chips 110 each associated with a corresponding account of a user. The user is able to actively select which one of the chips 110 is to be activated when completing a transaction by selecting an account from a menu of account options. As a consequence, the number of payment cards that an individual has to carry may be reduced to a single card.

The card member 105 having a front 115 and a back 117. A plurality of sockets 120 are provided on the card member 105 for housing the chips 110. The chips 110 are released from the sockets 120 by depressing an actuating button 125. Thus, it will be appreciated that the chips 110 are releasably secured in the sockets 120. The control chip 130 is operably coupled to the sockets 120 such that the control chip 130 is able to communicate with the programmable chips 110 when they are plugged into the sockets 120. The control chip 130 is a microprocessor which is embedded into the carrier member 105. A contact pad 135 is provided over the control chip 130 for electrically coupling the control chip 130 to a POS device during a transaction. The control chip 130 may be an EMV smart chip for example. The EMV standard was developed by Europay®, MasterCard® and Visa®, to ensure global interoperability for chip-based payment transactions. When a consumer uses an EMV-enabled device to pay at an EMV terminal, it can be identified as an authentic, approved payment instrument belonging to that consumer through a process called dynamic authentication. When used with a PIN (Personal Identification Number), the chip 100 verifies that the consumer is indeed using their own card. Each of the chips 110 is associated with a corresponding PIN number. In order to complete a transaction the user enters the PIN number of the selected chip on the POS device or ATM.

A visual display unit (VDU) 138 may be provided on the card member 105 in order to display the particulars of the chip 110 which is selected by the card holder to complete the transaction. The particulars of the selected chip 110 may include for example but not limited to, expiry date, account number, card verification code, and bank specific details. The payment card 100 may include a power source such as a battery or a solar cell. The power source may be used to power the (VDU) 138 and the chips 110. Alternatively, the payment card may be configured to derive power at a point of sale (e.g., from a POS terminal when inserted therein, etc.) during a transaction. In this scenario, the POS terminal may provide a menu for facilitating a user selecting one of the programmable chips to be active during the transaction. In the exemplary arrangement, the VDU 138 is provided on the front 115 of the card member 105. However, it will be appreciated that the VDU 138 could be located on the back 117 of the card member 105. Each of the chips 110 has an associated indicator for indicating which one of the chips 110 is active. In the exemplary arrangement, the indicator is provided as a light emitting diode and may be incorporated into the buttons 125.

In at least one embodiment, a magnetic stripe 140 may be provided on the back 117 of the card member 105. It will be appreciated that as EMV becomes prevalent the magnetic stripe may become an optional feature. Contemporary credit, debit, identification, pass-key and even cash cards use magnetic strips that maintain encoded information for authenticating and identifying the user of a card. The control chip 130 is configured to selectively activate and/or deactivate the magnetic stripe 140. The card holder is able to use the magnetic stripe 140 to complete a transaction instead of using one of the chips 110, if desired. The magnetic stripe 140 is swiped through a magnetic stripe reader on a point of sale (POS) terminal to perform a transaction.

Figure 3:
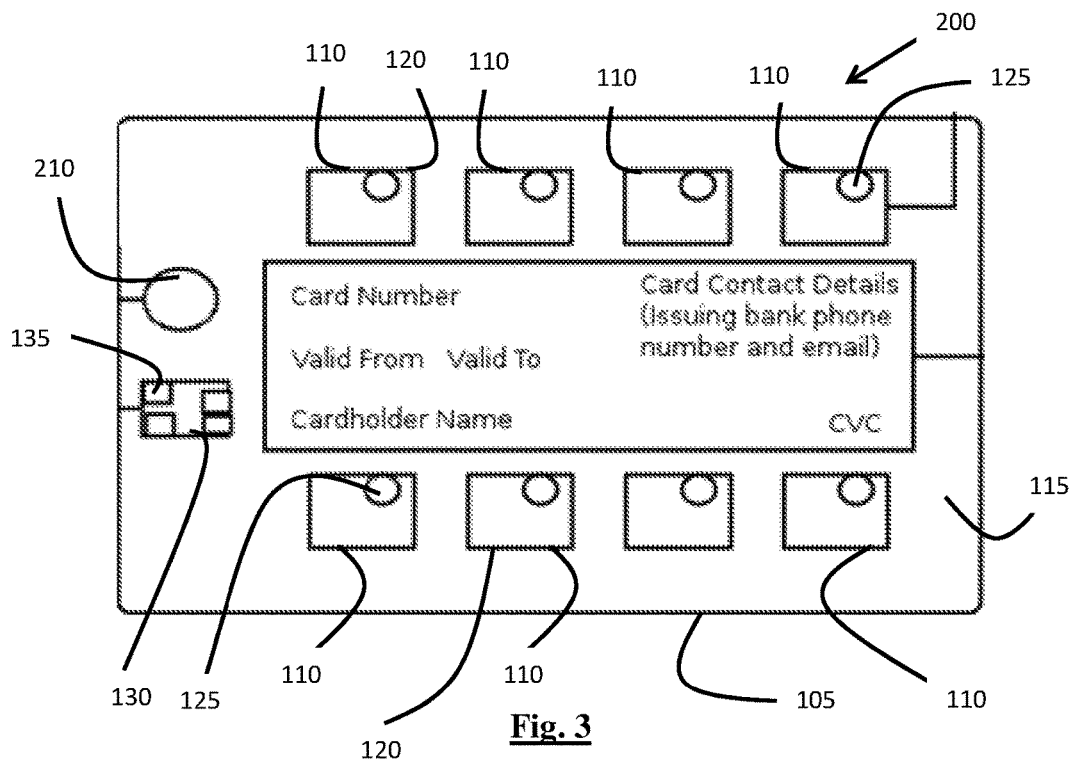
FIG. 3 is a front view of another payment card which is also in accordance with the present teaching.

Referring now to FIG. 3, there is provided another payment card 200 which is also in accordance with the present disclosure. The payment card 200 is substantially similar to the payment card 100 and like components are indicated by similar reference numerals. The main difference between the payment card 100 and the payment card 200 is that the control chip 130 is configured to provide virtual card capabilities. The control chip 130 is configured to provide a virtual payment number in response to the card holder depressing a virtual payment number button 210. The virtual payment number which is generated by the control chip 130 is associated with an account of the card holder. As the frequency of e-commerce and transactions conducted via the Internet increases, the use of virtual payment numbers (VPNs) have also increased. A VPN is a payment card number that is linked to but different from the primary account number (PAN) such that the VPN can be mapped back to the PAN from a database of VPNs but is not otherwise directly derivable from the PAN. Virtual payment numbers generally offer consumers extra flexibility over traditional payment cards by being capable of electronic issuance and distribution. The virtual payment number which is generated by the card 200 may be a controlled payment number (CPN) (also known as a limited use number), allowing for the setting of various limits and controls. The virtual payment number may include additional fraud protection for the card holder, such as by being limited to use for a specific merchant, specific time and/or date, within a specific transaction amount, etc.

Figure 4:
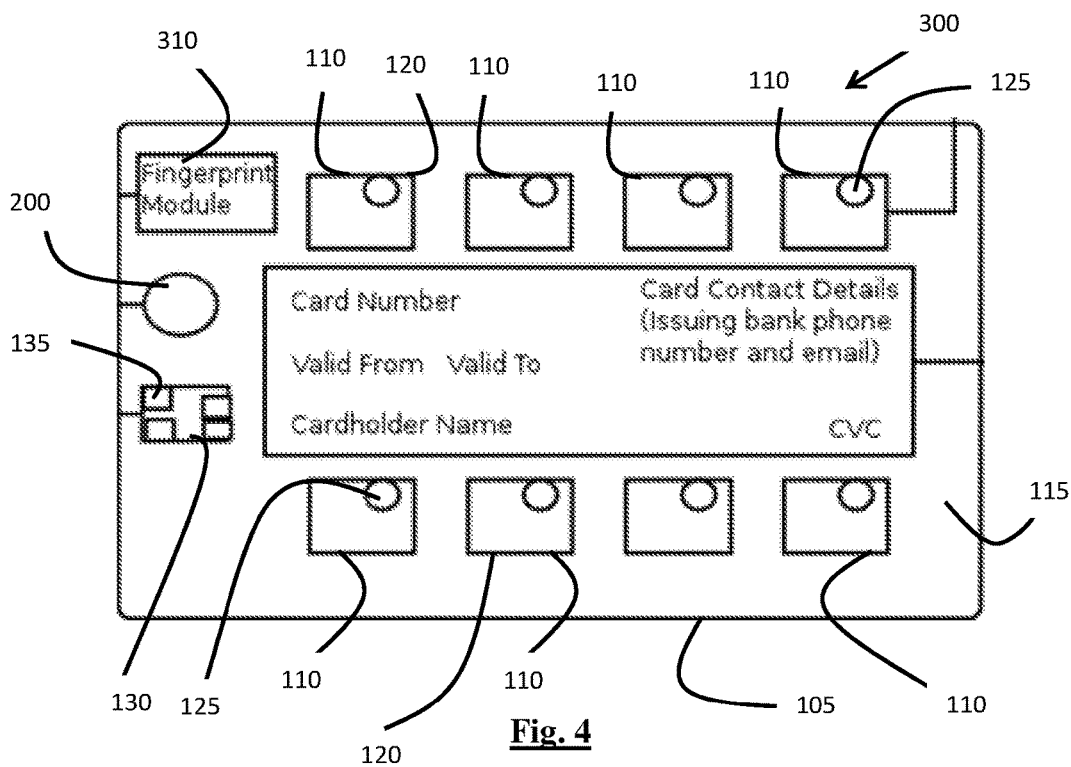
FIG. 4 is a front view of a further payment card which is also in accordance with the present teaching.

FIG. 4 illustrates another payment card 300 which is also in accordance with the present disclosure. The payment card 300 is substantially similar to the payment card 200 and like components are indicated by similar reference numerals. The main difference between the payment card 200 and the payment card 300 is that the payment card 300 includes a biometric reader as a fraud prevention mechanism. In the exemplary embodiment, the biometric reader is a fingerprint reader 310. The control chip 130 is in communication with the fingerprint reader 310. The card holder may be requested to have their fingerprints read by the fingerprint reader 310 prior to a transaction being completed. If the fingerprint of the card holder which is read by the fingerprint reader 310 does not match a stored fingerprint of the card holder, the control chip 130 terminates the transaction. In contrast, if the fingerprint of the card holder which is read by the fingerprint reader 310 matches a stored fingerprint of the card holder, the control chip 130 allows the transaction to be completed.

Figure 5:
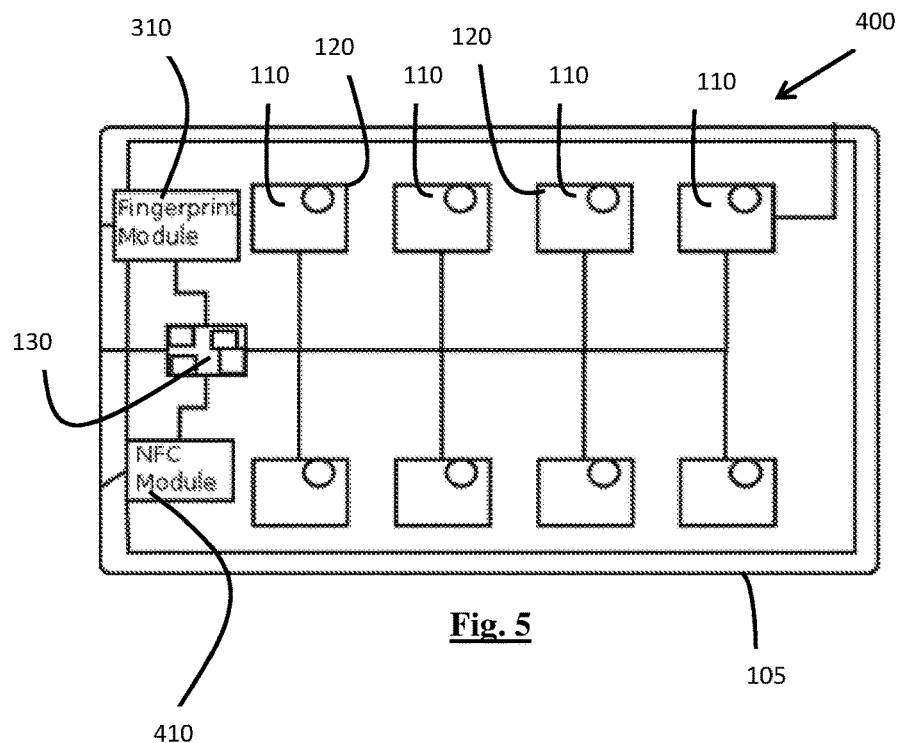
FIG. 5 is a front view of another payment card which is also in accordance with the present teaching.

FIG. 5 illustrates another payment card 400 which is also in accordance with the present disclosure. The payment card 400 is substantially similar to the payment card 300 and like components are indicated by similar reference numerals. The main difference between the payment card 300 and the payment card 400 is that the payment card 400 is configured to operate contactlessly. The account number associated with the selected chip 110 can be read automatically from the payment card 400 by a POS terminal, generally using a short range wireless technology such as Radio Frequency Identification (RFID). This approach is generally referred to as "contactless" or "proximity" payment. An RFID tag 410 is embedded into the card member 105 together with a suitable antenna to allow transmission and receipt of wireless signals. The transmissions may be powered by a radio frequency interrogation signal emitted by a proximity reader in the POS terminal. For an effective connection to be made, the payment card 400 may need to be brought into very close proximity to the proximity reader. This has security benefits and prevents confusion if there are multiple enabled payment cards in the general vicinity of the proximity reader, as will typically be the case in a retail establishment for example. This may be achieved by tapping the antenna of the payment card 400 against the proximity reader of the POS terminal. The contactless payment card 400 can be used to make electronic payment transactions via radio communication with an RFID-enabled payment terminal. The contactless payment card 400 can provide the card holder with a fast convenient way to pay for goods and services.

Several RFID technologies are available for use in contactless payment cards and card readers/terminals. The basic components of a contactless system are the contactless reader (or Proximity Coupling Device (PCD)) and a transponder. The contactless reader is an antenna connected to an electronic circuit. A transponder consists of an inductive antenna and an integrated circuit connected to the ends of this antenna. The combination reader-transponder behaves as a transformer. An alternating current passes through a primary coil (reader antenna) that creates an electromagnetic field, which induces a current in the secondary coil (transponder antenna). The transponder converts the electromagnetic field (or RF field) transmitted by the contactless reader (PCD) into a DC voltage by means of a diode rectifier. This DC voltage powers up the transponder's internal circuits. The configuration and tuning of both antennas determines the coupling efficiency from one device to the other.

Figure 6:
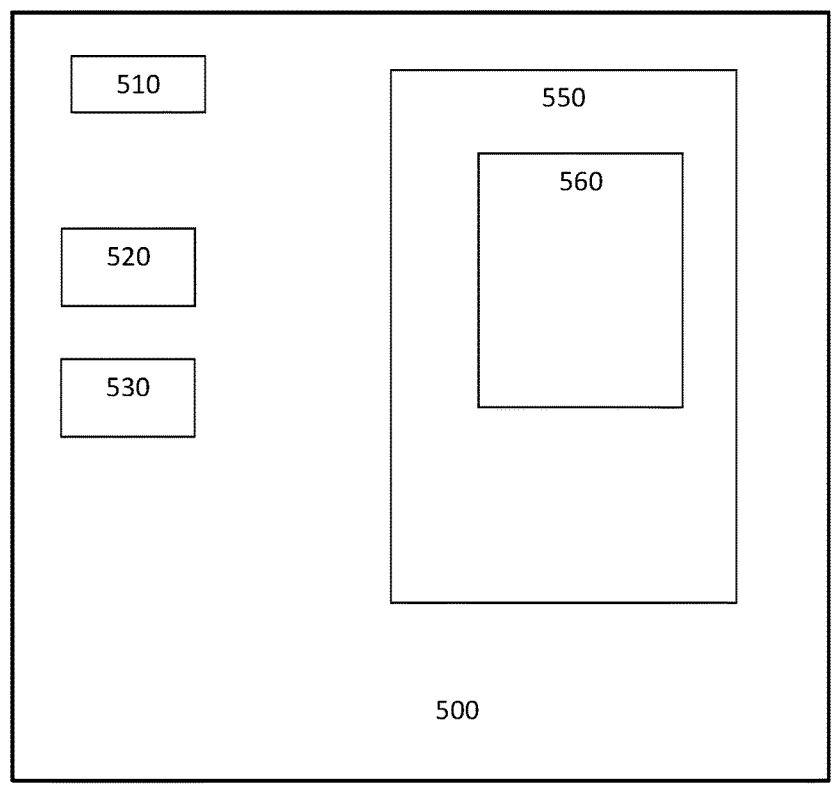
FIG. 6 is block diagram of a mobile device configured to communicate with a payment card.

FIG. 6 is a block diagram illustrating a configuration of a mobile device 500 according to an embodiment of the present disclosure. The mobile device 500 includes various hardware and software components that allows the mobile device 500 to communicate with the control chip 130 via the RFID tag 410. The mobile device 500 comprises a user interface 510, a processor 520 in communication with a memory 550, and a communication interface 530. The processor 520 functions to execute software instructions that can be loaded and stored in the memory 550. The processor 520 may include a number of processors, a multi-processor core, or some other type of processor, depending on the particular implementation. The memory 550 may be accessible by the processor 520, thereby enabling the processor 520 to receive and execute instructions stored on the memory 550. The memory 550 may be, for example, a random access memory (RAM) or any other suitable volatile or non-volatile computer readable storage medium. In addition, the memory 550 may be fixed or removable and may contain one or more components or devices such as a hard drive, a flash memory, a rewritable optical disk, a rewritable magnetic tape, or some combination of the above.

One or more software modules 560 may be encoded in the memory 550. The software modules 560 may comprise one or more software programs or applications having computer program code or a set of instructions configured to be executed by the processor 520. Such computer program code or instructions may be used to configure the chip 110 with updated software to enhance security, for example. The communication interface 530 is operable to use near field communication to communicate with the control chip 130. In an exemplary arrangement, if one of the chips 110 becomes inadvertently dislodged from their socket 120, the control chip 130 sends an alert message to the mobile device 500 of a potential security risk.

The functions and/or steps and/or operations included herein, in some embodiments, may be described in computer executable instructions stored on a computer readable media (e.g., in a physical, tangible memory, etc.), and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

Further, it should be appreciated that one or more aspects of the present disclosure transform a general-purpose computing device into a special-purpose computing device when configured to perform the functions, methods, and/or processes described herein.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The present disclosure is not limited to the embodiment(s) described herein but can be amended or modified without departing from the scope of the present disclosure. Additionally, it will be appreciated that in embodiments of the present disclosure some of the above-described steps may be omitted and/or performed in an order other than that described. It will be appreciated that the payment card may be manufactured using steps such as, providing a card member; providing a plurality of programmable chips, at least one of which is releasably attached to the card member; each programmable chip has an associated personal identification number (PIN); and providing a control chip which is operable for selecting one of the programmable chips to be active during a transaction.

It will further be appreciated that elements of any embodiment disclosed herein may be combined interchangeably with elements of any other embodiment, except where such elements may be mutually exclusive. The above-described embodiments are, therefore, to be considered in all respects to be illustrative and not restrictive.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. As described above, the method steps, processes, and operations described herein are not to be construed as necessarily requiring their performance in the particular order discussed or illustrated, unless specifically identified as an order of performance. It is also to be understood that additional or alternative steps may be employed. As used herein, the term "and/or" includes any and all combinations of one or more of the associated listed items.

When a feature is referred to as being "on," "engaged to," "connected to," "coupled to," "attached to," "associated with," "included with," or "in communication with" another feature, it may be directly on, engaged, connected, coupled, attached, associated, included, or in communication to or with the other feature, or intervening features may be present.

What is claimed is:

1. A payment card for multiple accounts, the payment card comprising:
   a card member;
   a plurality of individual sockets coupled to the card member, each of the individual sockets configured to accept a single programmable chip;
   a plurality of programmable chips, at least one of which is releasably attached to the card member by way of one of the plurality of individual sockets; each programmable chip associated with a different payment account having a primary account number (PAN), and each programmable chip including a personal identification number (PIN) for the corresponding payment account associated with said programmable chip; and
   a control chip coupled to each of the plurality of sockets and configured to select one of the programmable chips to be active during a financial transaction only after the PIN for the selected one of the programmable chips is provided by a user associated with the payment card.

2. The payment card of claim 1, further comprising a magnetic stripe.

3. The payment card of claim 2, wherein the control chip is configured to communicate with the magnetic stripe; and wherein the control chip is configured to control whether the magnetic stripe is utilized in the transaction.

4. The payment card of claim 1, wherein the control chip is configured to provide a virtual payment number in the transaction for a payment account associated with the selected one of the programmable chips, in place of a PAN for said payment account.

5. The payment card of claim 1, further comprising a wireless communication module coupled to the control chip; and
   wherein the control chip is configured to communicate one of a PAN and a virtual payment number associated with the selected one of the programmable chips in connection with the transaction.

6. The payment card of claim 1, further comprising a biometric reader coupled to the control chip, the biometric reader configured to read a biometric of the user and communicate the biometric to the control chip; and wherein the control chip is configured to match the received biometric to a stored biometric prior to permitting the transaction to be completed.

7. The payment card of claim 6, wherein the biometric reader is operable to read a fingerprint.

8. The payment card of claim 1, wherein the selected one of the programmable chips includes an indicator for visually indicating the selected one of the programmable chips.

9. The payment card of claim 1, further comprising a display.

10. The payment card of claim 1, further comprising a power source.

11. A method of using a payment card for multiple accounts, the payment card comprising a card member, a plurality of individual sockets coupled to the card member, and a control chip coupled to each of the plurality of individual sockets, wherein each of the plurality of individual sockets is configured to releasably accept at least one programmable chip, the method comprising:

plugging at least one programmable chip into one of the plurality of individual sockets of the payment card, wherein the at least one programmable chip is associated with a payment account having a payment account number, and wherein the at least one programmable chip includes a personal identification number (PIN) for the corresponding payment account associated with said at least one programmable chip;

interfacing the payment card, as part of a financial transaction, with a point of sale (POS) device and/or an automated teller machine (ATM);

selecting, by the control chip, the at least one programmable chip for activation during the financial transaction;

receiving, by the control chip, the PIN for the corresponding payment account associated with said at least one programmable chip from the POS device and/or the ATM; and providing, by the control chip, to the POS device and/or the ATM, the payment account number for the corresponding payment account associated with said at least one programmable chip only after the control chip verifies the received PIN.

12. The method of claim 11, wherein providing the payment account number to the POS device and/or the ATM includes providing a virtual payment number in place of a primary account number (PAN) for the corresponding payment account associated with said at least one programmable chip.

13. The method of claim 11, wherein the at least one programmable chip comprises an indicator; and further comprising visually indicating, by the indicator, the at least one programmable chip when the at least one programmable chip is selected for activation during the financial transaction.

14. The method of claim 11, further comprising deriving, by the payment card, power for the payment card from the POS device and/or the ATM when the payment card is interfacing with the POS device and/or the ATM in connection with the transaction.

15. The method of claim 14, further comprising receiving a user input indicative of the at least one programmable chip, via the POS device and/or the ATM, prior to selecting the at least one programmable chip; and wherein selecting the at least one programmable chip for activation includes selecting the at least one programmable chip for activation based on the user input.

* * * * *